United States Patent
Barfoot et al.

(10) Patent No.: US 10,294,778 B2
(45) Date of Patent: May 21, 2019

(54) DOWNHOLE OPTICAL COMMUNICATION

(71) Applicant: Halliburton Energy Services, Inc., Houston, TX (US)

(72) Inventors: David A Barfoot, Houston, TX (US); John L. Maida, Jr., Houston, TX (US); Etienne M. Samson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/024,308

(22) PCT Filed: Nov. 1, 2013

(86) PCT No.: PCT/US2013/068133
§ 371 (c)(1),
(2) Date: Mar. 24, 2016

(87) PCT Pub. No.: WO2015/065479
PCT Pub. Date: May 7, 2015

(65) Prior Publication Data
US 2016/0208603 A1    Jul. 21, 2016

(51) Int. Cl.
*E21B 47/12* (2012.01)
*H04B 10/25* (2013.01)
(Continued)

(52) U.S. Cl.
CPC ....... *E21B 47/123* (2013.01); *H04B 10/2504* (2013.01); *H04B 10/2587* (2013.01); *H04B 10/5161* (2013.01)

(58) Field of Classification Search
CPC .............. E21B 47/123; H04B 10/2504; H04B 10/2587; H04B 10/5161; H01S 3/107;
(Continued)

(56) References Cited

U.S. PATENT DOCUMENTS 4,389,645 A    6/1983    Wharton
4,547,774 A    10/1985   Gould
(Continued)

OTHER PUBLICATIONS

International Search Report and Written Opinion dated Jul. 25, 2014, issued in corresponding application No. PCT/US2013/068133, 3pgs.

*Primary Examiner* — Orlando Bousono
(74) *Attorney, Agent, or Firm* — Chamberlain Hrdlicka

(57) ABSTRACT

A method of optical communication in a well can include launching light having substantially coherent phase into an optical waveguide extending in a wellbore, modulating light having substantially coherent phase in the wellbore, and receiving the modulated light transmitted via the same optical waveguide. A well system can include at least one optical waveguide extending in a wellbore, and a downhole optical modulator which modulates light transmitted via the optical waveguide, the optical modulator comprising a potassium titanyl phosphate crystal. Another method of optical communication in a well can include launching light into an optical waveguide extending in a wellbore, the light launched into the optical waveguide having information modulated thereon using a carrier, modulating light in the wellbore, the modulating comprising modulating information using a subcarrier of the carrier, and transmitting the light modulated in the wellbore via the same optical waveguide.

19 Claims, 8 Drawing Sheets

(51) Int. Cl.
*H04B 10/516* (2013.01)
*H04B 10/2587* (2013.01)

(58) Field of Classification Search
CPC ......... H01S 3/109; H01S 3/1083; G01V 8/02; G02B 27/0905; G02B 27/0994; G02B 27/48
See application file for complete search history.

(56) References Cited

U.S. PATENT DOCUMENTS

| | | | |
|---|---|---|---|
| 5,276,745 A * | 1/1994 | Revelli, Jr. | G02B 6/1245 369/44.12 |
| 5,898,517 A | 4/1999 | Weis | |
| 7,261,162 B2 | 8/2007 | Deans | |
| 7,420,475 B2 | 9/2008 | Adnan | |
| 7,515,774 B2 | 4/2009 | Vannuffelen | |
| 7,929,812 B2 | 4/2011 | Vannuffelen | |
| 8,274,400 B2 | 9/2012 | Wilson | |
| 2002/0196993 A1 | 12/2002 | Schroeder | |
| 2005/0276285 A1 | 12/2005 | Huang et al. | |
| 2006/0133711 A1 * | 6/2006 | Vannuffelen | E21B 47/123 385/1 |
| 2006/0152383 A1 | 7/2006 | Yamate et al. | |
| 2006/0157239 A1 | 7/2006 | Ramos et al. | |
| 2008/0143552 A1 | 6/2008 | Mallison et al. | |
| 2008/0316567 A1 * | 12/2008 | Grasser | G02B 6/12007 359/237 |
| 2009/0056434 A1 * | 3/2009 | Csutak | G01V 8/02 73/152.18 |
| 2009/0135860 A1 * | 5/2009 | Maleki | H01S 3/1305 372/20 |
| 2009/0224936 A1 * | 9/2009 | Vannuffelen | E21B 47/123 340/854.7 |
| 2010/0018703 A1 | 1/2010 | Lovell et al. | |
| 2010/0194586 A1 | 8/2010 | Tjhang et al. | |
| 2010/0194588 A1 | 8/2010 | Menezes et al. | |
| 2010/0220051 A1 * | 9/2010 | Grasser | G02B 6/12007 345/102 |
| 2011/0139447 A1 | 6/2011 | Ramos et al. | |
| 2011/0140907 A1 | 6/2011 | Louden | |
| 2011/0222864 A1 * | 9/2011 | Vassilieva | H04B 10/2513 398/158 |
| 2011/0290992 A1 | 12/2011 | Sato et al. | |
| 2012/0026213 A1 * | 2/2012 | Grasser | G02B 6/12007 345/690 |
| 2012/0055264 A1 * | 3/2012 | Sinha | G01F 1/663 73/861.25 |
| 2012/0327961 A1 * | 12/2012 | Poon | H01S 3/10038 372/26 |
| 2013/0319984 A1 * | 12/2013 | Linyaev | B23K 26/106 219/121.72 |
| 2014/0231085 A1 * | 8/2014 | Zediker | E21B 29/02 166/288 |

* cited by examiner

DOWNHOLE OPTICAL COMMUNICATION

TECHNICAL FIELD

This disclosure relates generally to operations performed and equipment utilized in conjunction with a subterranean well and, in one example described below, more particularly provides for relatively high bandwidth optical communication in wells.

BACKGROUND

High temperatures (for example, ~200 deg. C. and above) and long distances (for example, ~3 km and more) can make optical telemetry very impractical and/or unreliable using conventional techniques. For these reasons and others, it will be appreciated that improvements are continually needed in the art of downhole optical communication. Such improvements may be useful whether or not the optical communication is performed at relatively high temperatures or over relatively long distances.

DETAILED DESCRIPTION

Figure 1:
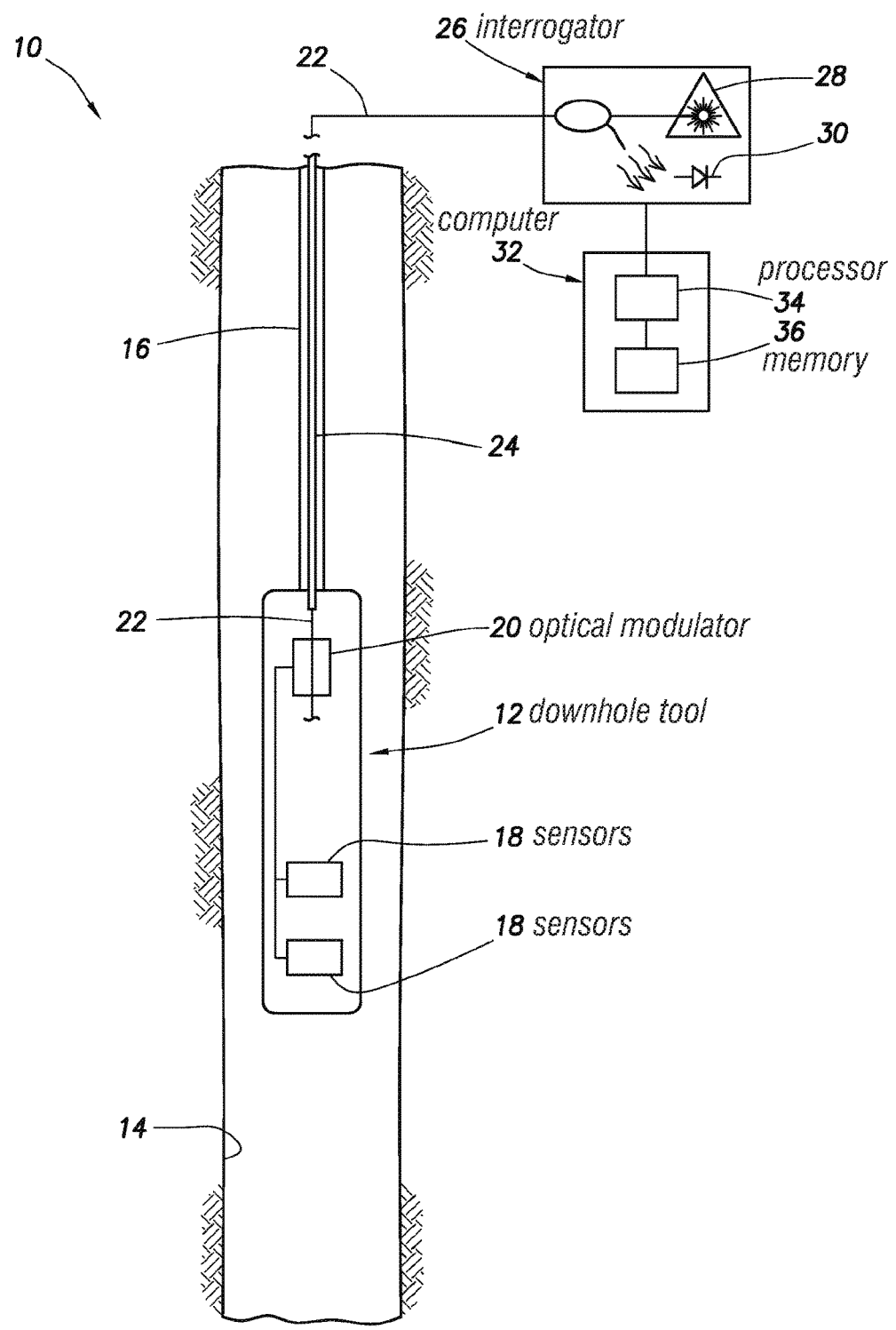
FIG. 1 is a representative partially cross-sectional view of a well system and associated method which can embody principles of this disclosure.

In one example, this specification is directed to high speed fiber optic communication systems, and methods for communication between a remote location (such as, a surface location, a subsea facility, a floating rig, etc.) and one or more downhole tools/instruments, using only passive (un-powered) optical components deployed downhole, other than an optical modulator. The downhole tool or instrument may be attached to a wireline cable, slickline, coiled tubing, or any other downhole tool conveyance method where a fiber optic cable may be deployed.

Coherent phase light can be used in examples described below, although coherency is not strictly necessary in all examples. Waveguides other than optical "fibers" may be used in examples described herein.

This specification provides several methods for high speed telemetry to and from downhole tools using optical telemetry over one or more optical waveguides. Single-mode fiber may be preferred for most configurations, but multi-mode fiber or polarization-maintaining fiber may also (or alternatively) be used in some configurations.

In typical logging operations, a package of sensors or tool string is lowered into a wellbore on a cable. Well logging activities may be performed in open hole or cased hole. Slickline or coiled tubing may be used instead of a cable.

The downhole environment may include high temperatures (such as, 200+ deg. C.) and/or high pressures (such as, 137+ MPa), which limits a complexity of electronic and optical components that can survive downhole. In recent years, these downhole sensor packages, tools strings and instruments have increased in complexity and capability.

Due to the increased capabilities, the downhole tools have created a need for higher speed telemetry than can be currently achieved with electrical signaling over a metal conductor. Metal conductors typically have a maximum transmission rate of about 1 Mbit/sec over a cable several kilometers long.

Due to much higher signaling bandwidth and much lower signal attenuation over distance (typically referred to as the bandwidth-distance product), optical techniques are needed to increase the bandwidth-distance product of downhole communication systems. Today's fiber optic communication technology, for example, can achieve bit rates on a single fiber optic waveguide exceeding 100 Gbit/sec over a distance greater than 100 km.

By providing a high bandwidth communication channel from the downhole tools to the surface (or other remote location), many complex downhole tools can be simplified. For example, in prior metal conductor communication methods, complex signal processing and data compression may be required to preprocess raw sensor data before sending it to the surface, due to a low bandwidth-distance product.

In addition, some existing downhole tools cannot send data in real-time due to a large volume of sensor data generated downhole, and must store it in memory for later retrieval at the surface. Providing a fiber optic communication link to the surface with a much higher bandwidth-distance product than possible with metal conductor communication techniques will allow raw sensor data to be sent to the surface in real-time, where high-speed signal processing devices can process the data.

In prior methods for downhole fiber optic telemetry, a downhole optical source (for example, a light emitting diode (LED)) is amplitude-modulated with on-off keying (OOK) to transmit a stream of binary data (1's and 0's) to a surface optical receiver. Although these methods provide some advantages over metal conductor telemetry, maximum bit rates are typically limited to below 100 Mbit/sec (ref. [1], pg. 15). Furthermore, the optical source downhole will typically have a relatively short lifetime due to accelerated aging when operating at high temperature.

Thus, a communication system and method that does not require a downhole optical source, and only requires simple and robust optical components downhole, would be advantageous over the prior metal and optical communication systems and methods. In some examples, this specification provides for such advantages by using a downhole optical modulator instead of an optical source in the high temperature downhole environment. However, in some examples, a downhole optical source (such as, a fiber laser) may be used.

The optical modulator may be in the form of an electro-optic, acousto-optic, magneto-optic, electro-absorption or piezo-electric modulator. A piezo-electric modulator can function by applying strain to an optical waveguide, which strain induces an optical path length change and a resulting optical phase shift, or to a Bragg grating (which strain shifts a transmission spectrum of the grating). However, the scope of this disclosure is not limited to use of any particular type of optical modulator.

In some examples, the modulator receives an electrical modulation signal comprising downhole sensor data. Based on the modulation signal, the modulator changes a frequency, phase, amplitude (intensity) or polarization (including any combination of these parameters) of a light wave that passes through it. This allows for various modulations schemes, including but not limited to: amplitude shift keying (ref. [2], section 4.2.4), phase shift keying (ref. [2], section 4.2.2), frequency shift keying (ref. [2], section 4.2.3), polarization shift keying, and combinations of these (ref. [2], section 4.2.5, e.g., quadrature amplitude modulation (QAM)), etc. Thus, the scope of this disclosure is not limited to use of any particular optical modulation scheme.

Representatively illustrated in FIG. 1 is a system 10 for use with a well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a downhole tool 12 is conveyed in a wellbore 14 with a conveyance 16. The wellbore 14 is depicted in FIG. 1 as being open hole or uncased, but in other examples the wellbore could be cased or otherwise provided with a protective wellbore lining. The downhole tool 12 could be positioned internal to, external to, or in a wall of, any wellbore lining.

The conveyance 16 could be a wireline, a slickline, a coiled tubing, a segmented tubular string, a tractor, or any other type of conveyance. In some examples, the downhole tool 12 could be displaced in the wellbore 14 by means of flowing fluid, by gravity, or by any other technique.

However, it should be understood that it is not necessary for the downhole tool 12 to be displaced in the wellbore 14. In some examples, the downhole tool 12 could be permanently installed in the wellbore 14.

Although the downhole tool 12 is depicted in FIG. 1 as a single element, the downhole tool could comprise multiple sections, portions or components. These multiple sections, portions or components could be attached directly to each other, or some or all of them could be spaced apart from each other. Various forms of wired or wireless telemetry could be used to communicate between the multiple sections, portions or components. Thus, the scope of this disclosure is not limited to any particular number, construction or configuration of the downhole tool 12.

In the FIG. 1 example, the downhole tool 12 includes multiple instruments or sensors 18. The sensors 18 may be any types or combinations of sensors (such as, temperature, pressure, resistivity, nuclear magnetic resonance, chemical composition, pH, gamma ray, magnetic field, vibration, acoustics, flow rate, gas cut, spectrographic, chromatographic, etc.).

The downhole tool 12 also includes an optical modulator 20. The optical modulator 20 may be an electro-optic, acousto-optic, magneto-optic, electro-absorption or piezo-electric modulator, or any type of modulator capable of altering a light intensity, phase, frequency, polarity or combination of these.

The optical modulator 20 encodes data from the sensors 18 onto light transmitted via one or more optical waveguides 22 extending in the wellbore 14 and to a remote location. In this manner, the sensor data is optically communicated from the downhole tool 12 to the remote location. In some examples, data, commands and/or other information can also (or alternatively) be communicated from the remote location to the downhole tool 12 via the optical waveguide(s) 22.

In the FIG. 1 example, the optical waveguide 22 is included as part of a cable 24, which may be internal to, external to, or in a wall of, the conveyance 16. In other examples, the cable 24 can be the conveyance 16, or the cable may not be used at all (e.g., the optical waveguide 22 could extend along the conveyance or wellbore 14 without the use of a cable).

At the surface or another remote location, the optical waveguide 22 is connected to an optical telemetry unit or interrogator 26. In this example, the interrogator 26 includes at least an optical source 28 (such as, a laser or light emitting diode, etc.) and a photodiode, photo-detector or other type of opto-electric converter 30.

Note that the interrogator 26 is very simplified as depicted in FIG. 1. A large variety of other components may be used in the interrogator 26 (for example, interferometers, polarizers, de-polarizers, beam splitters, mirrors, lenses, filters, modulators, de-modulators, etc.), depending on particular circumstances. Thus, it should be understood that the scope of this disclosure is not limited to any particular type or configuration of optical interrogator.

The interrogator 26 is connected to a computer 32. In some examples, the computer 32 may be integrated with the interrogator 26. Equipment such as input devices (keyboards, mice, trackballs, touch screens, touch pads, wireless receivers, semiconductor, magnetic or optical media readers, etc.), output devices (displays, printers, semiconductor, magnetic or optical media writers, etc.) and communication devices (wired or wireless telemetry devices, satellite communication devices, etc.) may be used with the computer 32.

In the FIG. 1 example, the computer 32 includes at least a processor 34 and memory 36. The processor 34 can be used to control operation of the interrogator 26, to process information transmitted to the downhole tool 12, and/or to process information received from the downhole tool 12. The memory 36 may be used to store software for operating the processor 34, to store software for processing information (such as, commands, data, etc.), and/or to store data received from the downhole tool 12. The scope of this disclosure is not limited to use of any particular type of software, firmware or hardware with the computer 32.

The computer 32 is very simplified as depicted in FIG. 1. It should be understood that any type, number or configuration of processor and/or memory may be used in the computer 32, and in practice the computer can include other or different components and/or capabilities, in keeping with the scope of this disclosure.

Figure 2:
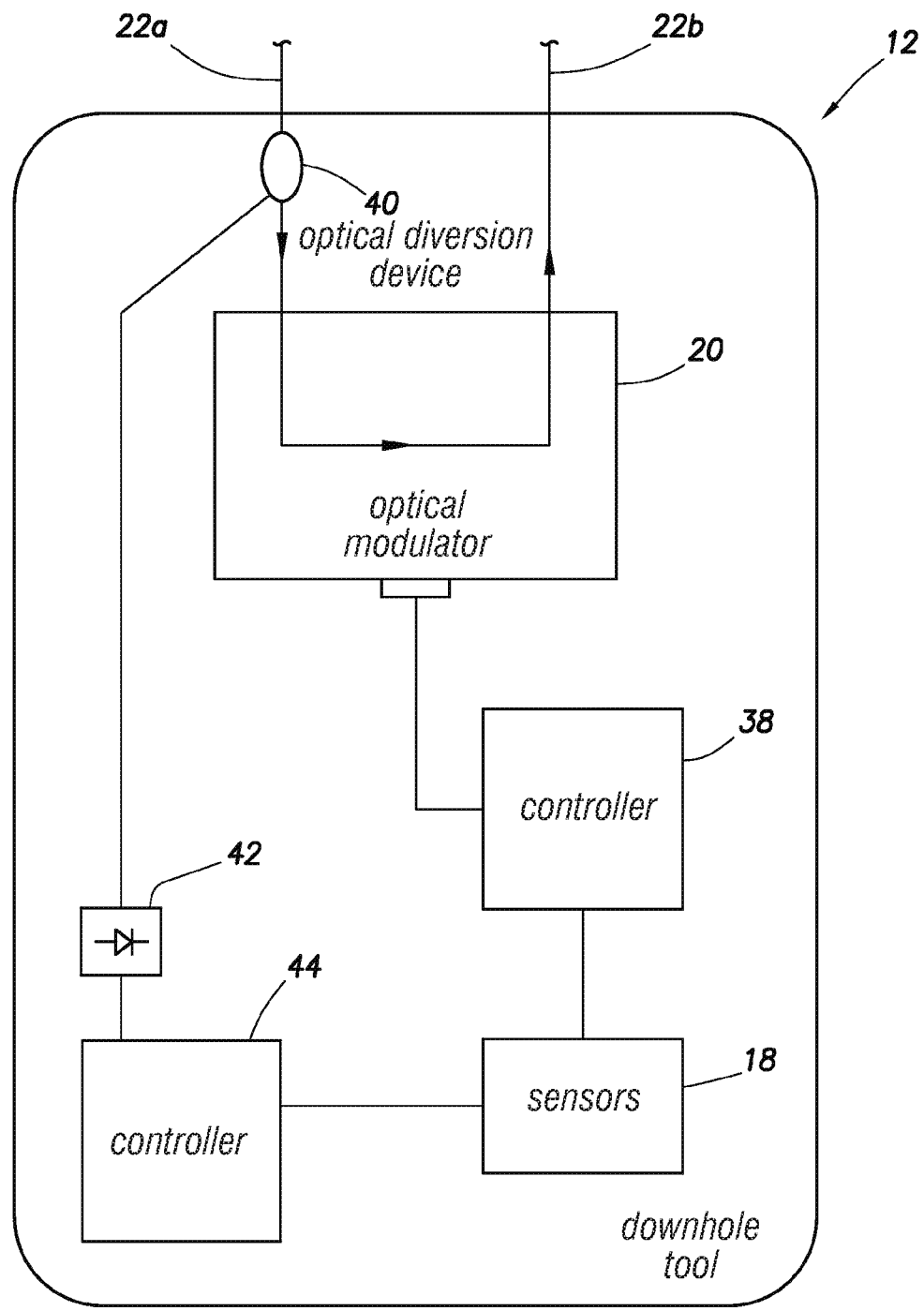
FIG. 2 is a representative schematic view of a downhole tool that may be used in the system and method of FIG. 1, and which can embody the principles of this disclosure.

FIG. 2 is a representative schematic view of one example of the downhole tool 12 that may be used in the system and method of FIG. 1, and which can embody the principles of this disclosure. Of course, the downhole tool 12 may be used with other systems and methods without departing from the scope of this disclosure.

In the example depicted in FIG. 2, two optical waveguides 22a,b are used. In one waveguide 22a, continuous wave light is transmitted to the downhole tool 12 from the remote location. For example, the light may be launched into the optical waveguide 22a using the light source 28 of the interrogator 26.

The light passes through the optical modulator 20, where it is modulated to encode data from the sensor 18, and the modulated light returns to the remote location via the other optical waveguide 22b. A controller 38 may be used to control operation of the modulator 20, so that the data from the sensor 18 is appropriately encoded.

Commands, instructions, data or other information may also be provided to the downhole tool 12 from the remote location via the light transmitted to the downhole tool on the optical waveguide 22a. The light can be appropriately modulated at the remote location, so that the commands, instructions, data or other information is encoded thereon.

In the downhole tool 12, a coupler, circulator, beam splitter or other optical diversion device 40 may be used to direct a portion of the light to a photodiode (such as a p-i-n photodiode or avalanche photodiode (APD)), a p-i-n field effect transistor (PINFET), a photo-resistor, a photo-detector or other opto-electric converter 42 (ref. [1], section 4.2). A resulting electrical signal can be received by a downhole tool controller 44. The controller 44 can be used to control operation of the downhole tool 12, to adjust settings, to calibrate the sensor 18, or to perform other functions in the downhole tool.

The two-waveguide (22a,b) method of FIG. 2 has an advantage in that Rayleigh backscattered light, which is a source of optical noise, will not be present in the optical signal received at the remote location via the waveguide 22b. In other examples, a single waveguide can be used for optical telemetry from the downhole tool 12 to the remote location, and/or for optical telemetry from the remote location to the downhole tool.

Figure 3:
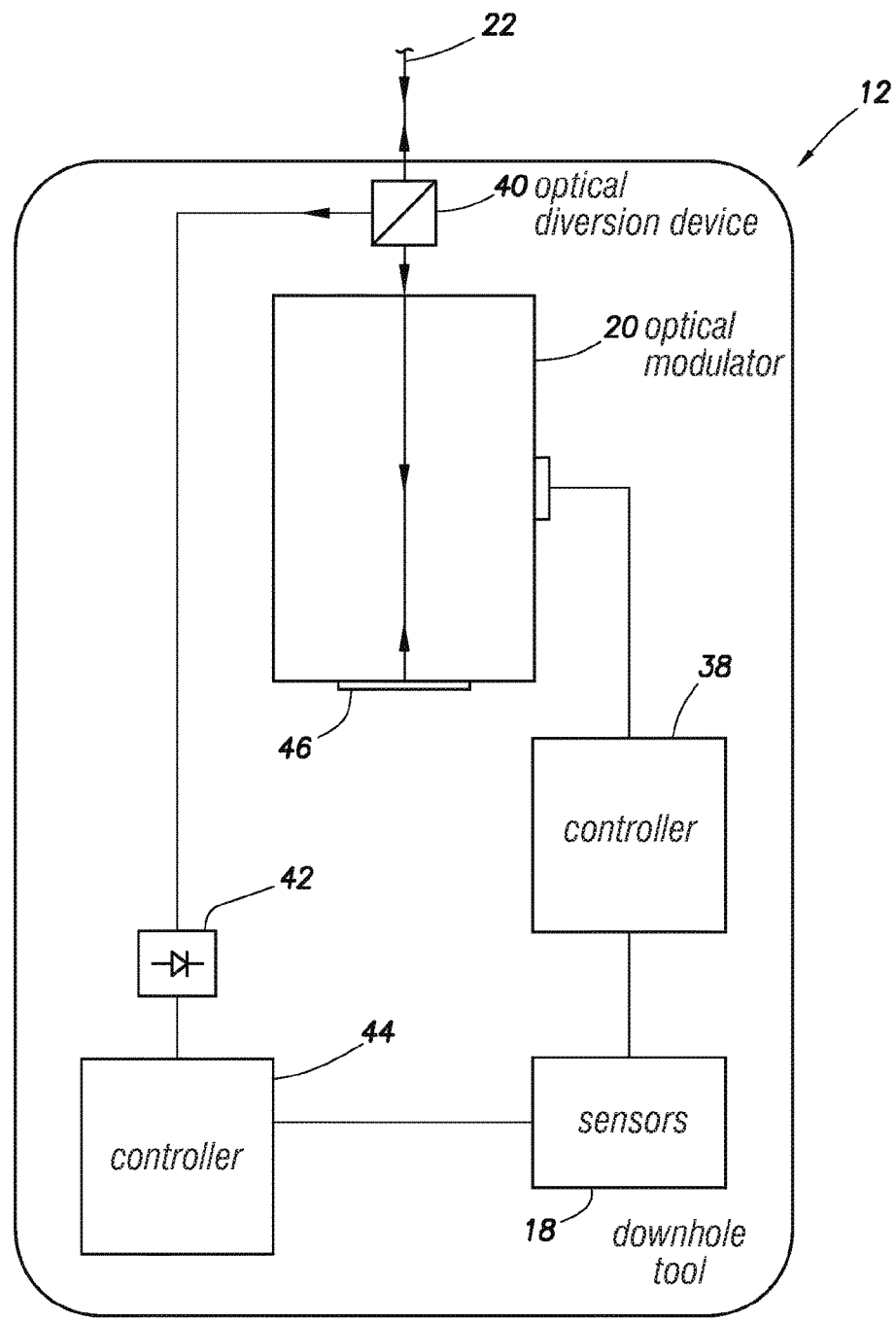
FIGS. 3-5 are representative schematic views of additional examples of the downhole tool.
Figure 4:
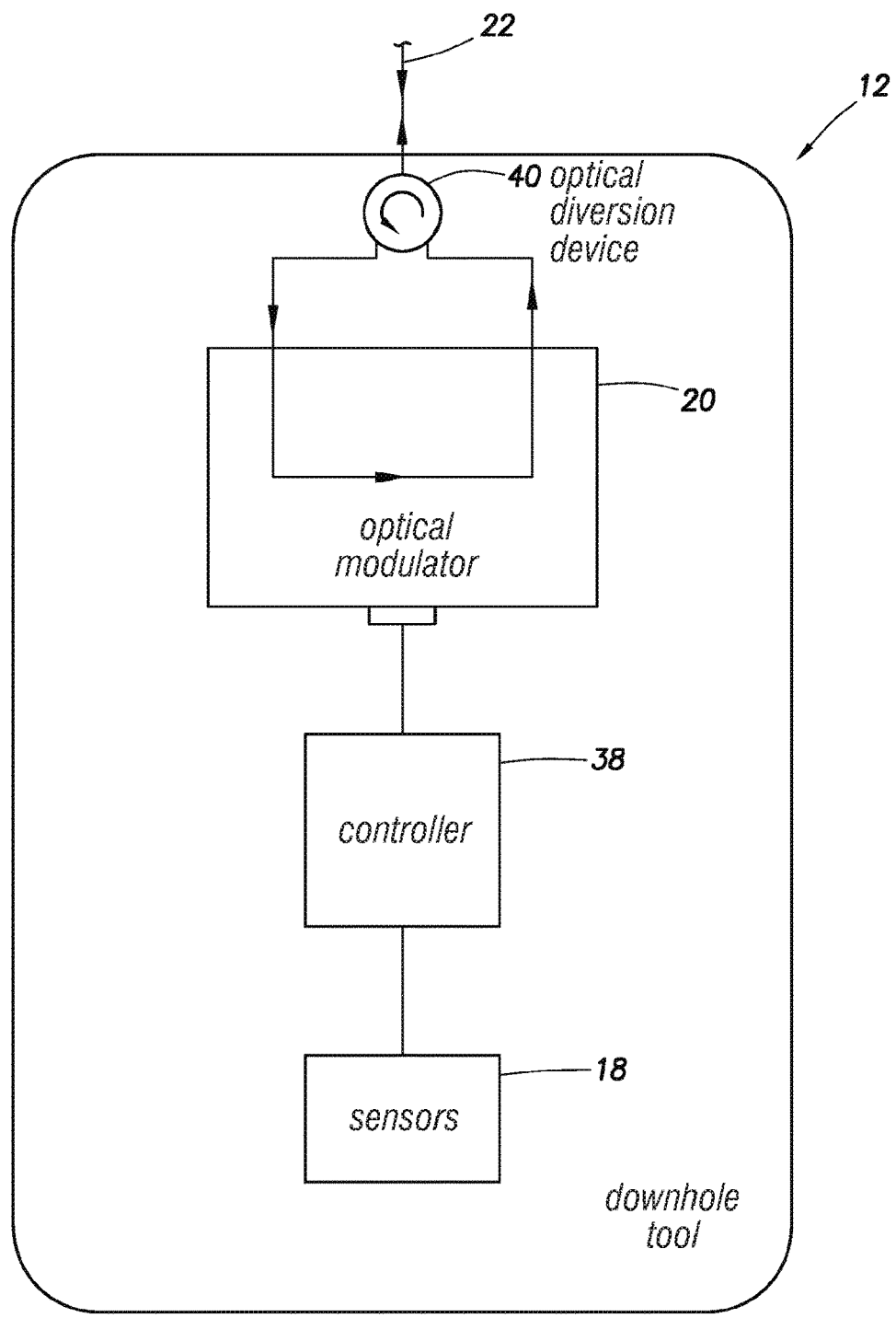
Figure 5:
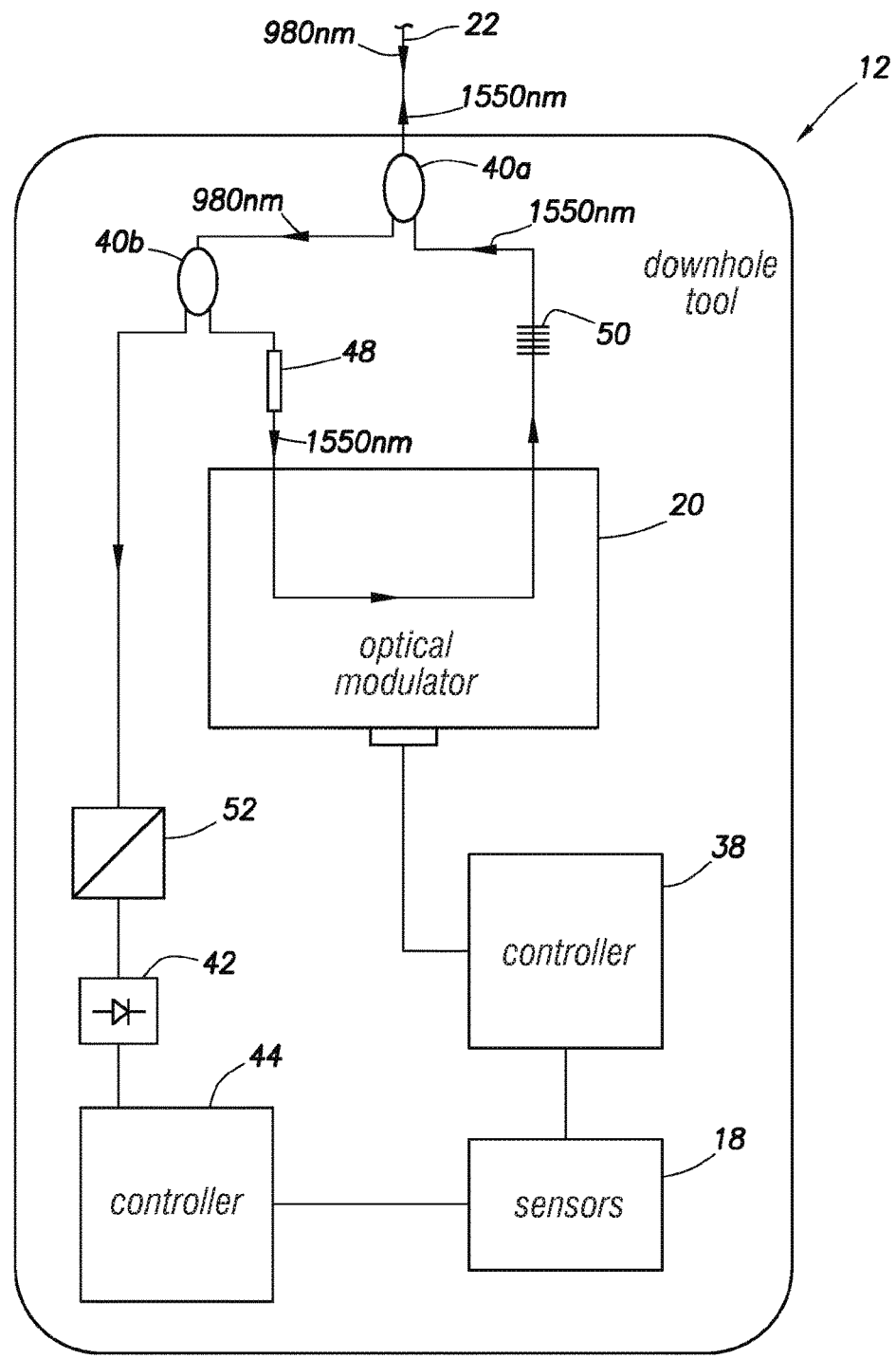

FIGS. 3-5 are representative schematic views of additional examples of the downhole tool 12. In these examples, only a single optical waveguide 22 is used for telemetry between the downhole tool 12 and the remote location.

In the FIG. 3 example, a reflector 46 is placed at one end of the optical modulator 20. The light which enters the optical modulator 20 from the waveguide 22 is reflected back through the modulator and receives an additional amplitude, phase, polarization or frequency shift before returning to the remote location via the waveguide. This method provides for a lower cost system, in that only one waveguide 22 is installed in the wellbore 14 (see FIG. 1).

For redundancy, two waveguides 22 may be deployed in the cable 24 (see FIG. 1) along with two optical modulators 20 in the downhole tool 12 (one modulator for each waveguide). The modulation signal from the controller 38 in that case could be split into two paths and applied to both optical modulators 20. At the remote location, either waveguide 22 could be used, or both could be used at the same time for increased noise immunity. If one of the waveguides 22 becomes damaged, or one of the optical modulators 20 is damaged, the other waveguide/modulator pair could be used instead.

A polarization beam splitter or other optical diversion device 40 may be utilized for transmitting telemetry to the downhole tool 12. For example, by splitting some of the light received at the tool 12 with a 2×2 coupler or polarization beam splitter, an optical signal, modulated at the surface by an optical modulator, may be received and decoded by the downhole tool 12.

In the case of a polarization beam splitter used for the device 40, amplitude modulation may be accomplished by modulating the light using a linear polarization controller at the remote location, and transmitting the polarization-modulated light to the tool 12. As the polarization of the light changes, the polarization beam splitter will convert the polarization changes into amplitude changes. Such amplitude modulation preferably would not use a full modulation depth of the signal, but may only modulate optical power at the converter 42 by, for example, 3 dB.

Because the optical telemetry to the tool 12 would typically be sent at much lower speeds (for example, 1 Mbit/sec or less) as compared to the optical telemetry from the tool (for example, at 100 Mbit/sec or higher), the relatively low speed modulation can be readily filtered out at the remote location when demodulating the relatively high speed telemetry. This is an example of subcarrier modulation.

In the FIG. 4 example, a 3-port circulator is used for the device 40. The circulator is used to route the light from the optical modulator 20 back into the optical waveguide 22.

Although the downhole tool controller 44 is not depicted in FIG. 4, the FIG. 4 example could include the controller 44, along with the converter 42 and any other components for receiving telemetry from the remote location. In any of the examples described herein, the controllers 38, 44 could be combined as a single component, or any other number of controllers could be used.

The single optical waveguide 22 methods of FIGS. 3 & 4 have an advantage of lower cost compared to the two-waveguide (22a,b) method of FIG. 2. However, in the FIGS. 3 & 4 methods, Rayleigh backscatter can propagate with the returned, modulated light at a same wavelength as the light initially launched into the waveguide 22.

One way to mitigate the return of Rayleigh backscatter with the modulated light is to use a wavelength conversion device downhole, so that a different wavelength modulated light is returned via the waveguide 22. In the FIG. 5 example, this wavelength conversion is performed prior to the light entering the optical modulator 20.

As depicted in FIG. 5, the optical wavelength conversion device 48 comprises a fiber laser. A fiber laser may be provided in a variety of configurations, but generally consists of a rare-earth doped fiber with reflectors at opposite ends. The reflectors are typically fiber Bragg gratings.

A fiber laser may be configured for forward pumping or backward pumping when combined with appropriate wavelength division multiplexing (WDM) devices or couplers. For producing a wavelength in the optical c-band, centered near 1550 nm, the fiber between the reflectors is typically erbium doped. A pump laser at a shorter wavelength, typically either 980 nm or 1480 nm, is used to excite electrons in the erbium doped fiber to a higher energy state. The electrons will synchronously drop to a lower energy state and simultaneously emit a photon for each electron, thereby producing highly coherent, narrow line-width, laser light in the c-band (near 1550 nm).

An advantage of this approach is that the 1550 nm light is not generated until the 980 nm or 1480 nm light enters the erbium doped fiber, therefore any Rayleigh backscatter generated in the waveguide 22 up to that point will be at 980 nm wavelength, which can be optically filtered out (at the remote location or in the downhole tool 12).

Another type of wavelength conversion device 48 that may be used in the downhole tool 12 is an amplified spontaneous emission (ASE) source, which could comprise an erbium doped fiber pumped with 980 nm or 1480 nm light. Because ASE sources do not produce narrow line width, coherent light, the modulation methods used may be limited to amplitude modulation, for example using a Mach-Zehnder electro-optic modulator (e.g., a Mach-Zehnder lithium niobate or potassium titanyl phosphate (KTP) modulator) or an electro-absorption modulator.

Dopants other than erbium may be used in an ASE source or fiber laser when operating at other wavelengths, for example, praseodymium for light in the o-band near 1300 nm, ytterbium (near 1000 nm), and thulium (near 1470 nm). Due to the broadband light produced by an ASE source, dispersion compensation may be used to compensate for chromatic dispersion. For example, at the remote location, a large chromatic dispersion of an opposite sign can be used to reverse the chromatic dispersion due to the broadband light. Additionally, a broadband or cascaded chirped fiber Bragg grating may be used for dispersion compensation.

Other wavelength conversion devices 48 that could be used in the tool 12 include various non-linear fibers or crystals with high optical non-linearities for up or down-conversion of wavelength via any desired non-linear optical process (such as, four-wave mixing, three-wave mixing, parametric down-conversion, second-harmonic generation, stimulated Raman or Brillouin scattering, etc.).

In the FIG. 5 example, 2×2 couplers are used as optical diversion devices 40$a,b$ to split the pump light that enters the downhole tool 12, and to return the modulated light to the waveguide 22. In other examples, a wavelength division multiplexing (WDM) device with a common port for the waveguide 22 connection and a 980 nm port on the lower left and a 1550 nm port on the lower right (as viewed in FIG. 5) could be used in place of the 2×2 coupler (device 40*a*). However, the 2×2 coupler may have an advantage for long term survivability at relatively high temperature in a wellbore, as compared to WDM devices.

For the 2×2 coupler configuration of the device 40*a* in FIG. 5, the 980 nm light that might otherwise enter the right side branch may be suppressed using a fiber Bragg grating, dichroic filter, or other type of filter 50 designed for blocking or reflecting 980 nm light. The pump light that exits the branch on the left will pass into a second 2×2 coupler (device 40*b*) with an unbalanced coupling ratio, such that a majority of the light enters the right branch going to the wavelength conversion device 48 (for example, 90%/10% coupling between right versus left sides).

The 980 nm light exiting the device 40*b* via the left branch (as viewed in FIG. 5) can be used for optical telemetry from the remote location to the downhole tool 12. This received telemetry may be in the form of a relatively low frequency modulation (as compared to the modulation produced by the modulator 20 for telemetry from the tool 12 to the remote location).

Polarization modulation can be accomplished at the remote location by using a polarization controller and launching modulated linearly polarized light into the waveguide 22. Such polarization modulation can be converted to amplitude modulation in the downhole tool 12 by passing the light through a polarizer 52 prior to the light entering the opto-electric converter 42. High speed polarization controllers are available with bandwidths exceeding 1 MHz, allowing for at least 1 Mbit/sec data transmission rates using this modulation method at the remote location.

The 980 nm light which exits the device 40*b* via its right branch (as viewed in FIG. 5) will enter the wavelength conversion device 48 (in this example, an erbium doped fiber laser) and provide pump energy, which will produce 1550 nm light. The 1550 nm light in the FIG. 5 example exits the fiber laser as a continuous wave and coherent (narrow line width) optical signal, and passes into the optical modulator 20, where it is modulated.

The modulated 1550 nm light exits the optical modulator 20 and passes through the filter 50 without significant attenuation. The modulated light enters the device 40*a* and is transmitted via the single optical waveguide 22 to the interrogator 26 (see FIG. 1) at the remote location.

Although less effective than wavelength conversion, in some examples an erbium-doped fiber amplifier (EDFA) could be used in place of the fiber laser to reduce the Rayleigh backscatter, because the light power as transmitted to the tool 12 could be much lower than after passing through the EDFA, therefore achieving some of the benefits of wavelength conversion. An EDFA could also be combined with the fiber laser, for example, by placing the EDFA after the fiber laser.

In any of the examples described herein, and as discussed above, the photo-detector or other opto-electric converter 42 may be configured to receive light transmitted from the remote location, to allow for telemetry to the tool 12. In typical applications, the telemetry bit rate requirements for telemetry to the tool 12 is expected (although not necessarily required) to be much lower than that required for telemetry from the tool to the remote location (for example, ~100 times less). This asymmetry of the data rates can be taken advantage of for simultaneous bi-directional communication using a single wavelength of light and a single optical waveguide 22.

For example, the telemetry signal transmitted to the tool 12 may be intensity modulated using on-off keying (OOK) to a modulation depth (i.e., modulation index) less than 100% and at a bit rate much lower than the telemetry from the tool to the remote location. The telemetry signal from the tool 12 may be transmitted via a subcarrier of the intensity modulated telemetry signal from the tool, for example, using a modulation method different from that of the telemetry to the tool (e.g., optical carrier phase shift keying or frequency shift keying), or at a different bandwidth/bit rate to reduce cross-talk between the telemetry signals.

In addition, because the equipment at the remote location is imparting the modulation on the optical signal transmitted to the tool 12, and can make a record of the modulation applied to the light, the effects of the modulation can be compensated for (if they appear in the telemetry signal received from the downhole tool). Optionally, the telemetry to the tool 12 may be sent using a light wavelength different from that used for the telemetry signal from the tool to the remote location, and a WDM device can be used at the remote location to separate out the telemetry signal transmitted from the tool.

The opto-electric converter 42 used downhole in the tool 12 would desirably have a relatively high operating temperature rating, such as, 125 deg. C. or higher. For example, Clairex Technologies, Inc. provides Al—Ga—As based photo-detectors (ref. [5] part #CLD340) rated for operation at up to 225 deg. C., and silicon PIN photodiodes rated to 125 deg. C. are available from Honeywell and Vishay. Multiple photo-detectors may be used for redundancy, for example, with the received light split equally to each photo-detector, or a downhole optical switch may select another photo-detector in case one stops working.

In some examples, the telemetry signal from the downhole tool 12 is transmitted by modulating a light wave initially sent from the remote location. In the FIG. 5 example, a wavelength conversion device 48 is used to mitigate Rayleigh backscatter noise, such as, when a single optical waveguide 22 is used. Information (such as, data from the sensor 18, confirmation of tool 12 operation, "handshake" or error correction codes, etc.) is converted from electrical to optical form using the modulator 20, which may modulate optical intensity, phase, frequency, polarization, or some combination of those parameters.

If a single optical waveguide 22 is used, the 1550 nm light could be reflected back through the modulator 20 and wavelength conversion device 48, for example, using a reflector 46 as in the FIG. 3 example. The 980 nm pump wavelength could be filtered out at the surface or other remote location.

However, separate waveguides 22a,b could be used in the FIG. 5 example, as in the FIG. 2 example. In that case, it may not be necessary to filter out the 980 nm pump wavelength.

Note that the 980 nm light does not have to be coherent phase. For example, a relatively broad line width optical source (such as, a light emitting diode) could be used in some examples.

In addition, 980 nm wavelength is not necessary (for example, 1480 nm could be used instead). Thus, the scope of this disclosure is not limited to any particular wavelengths or other parameters of the examples described herein.

Figure 6:
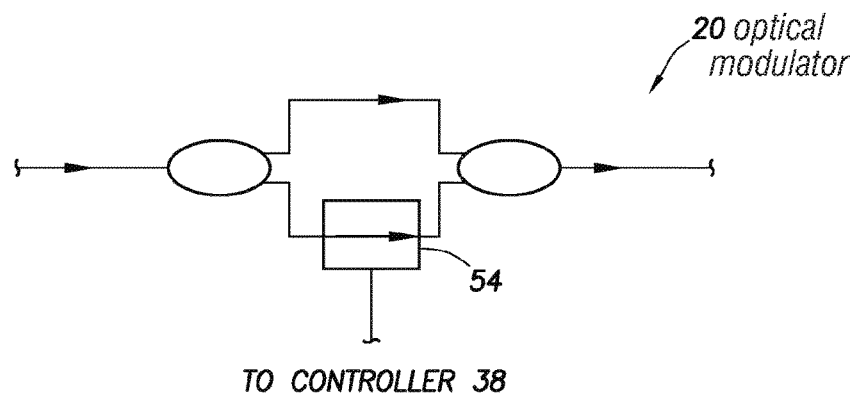
FIGS. 6-8 are representative schematic views of optical modulators that may be used in the downhole tools of FIGS. 2-5.
Figure 7:
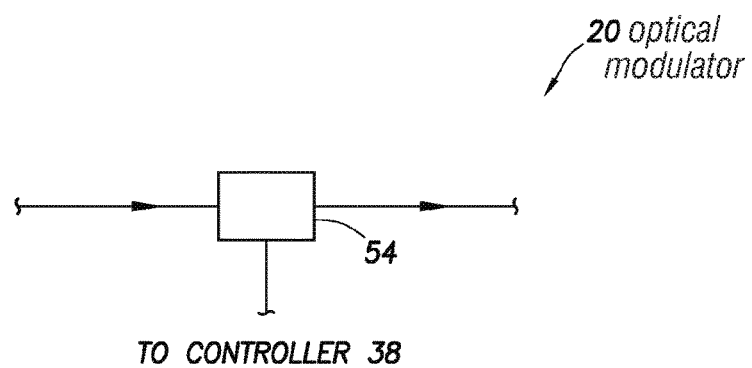
Figure 8:
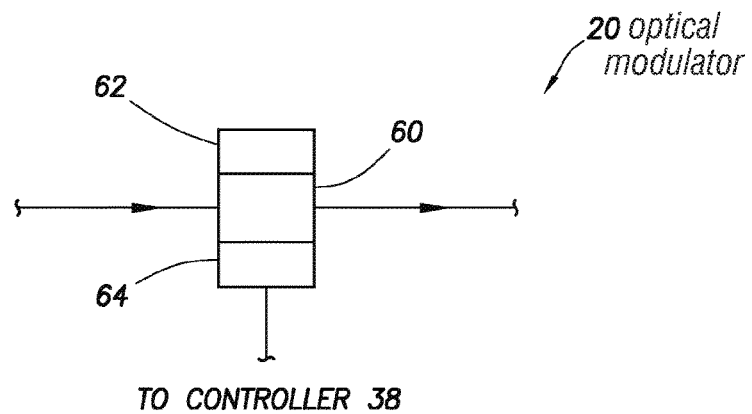

FIGS. 6-8 are representative schematic views of optical modulators that may be used in the downhole tools of FIGS. 2-5. However, it should be understood that the scope of this disclosure is not limited to use of the particular types of optical modulators depicted in FIGS. 6-8.

In the FIG. 6 example, the modulator 20 modulates an intensity of the light. For example, a voltage can be applied to an electro-optic modulator 20 to provide a differential phase shift, such that half of the light receives a phase shift based on the applied voltage. The other half receives a different phase shift based on the applied voltage, or does not receive any phase shift (for example, if the light is transmitted via a separate waveguide). When the phase shift difference between the two light waves equals PI radians, the signals will cancel when they recombine providing an "off" signal in OOK modulation. In the FIG. 6 example, a lithium niobate crystal 54 is used in one leg of a Mach-Zehnder interferometer 56 for production of phase shift.

In the FIG. 7 example, the modulator 20 comprises an electro-absorption modulator. For example, indium phosphide (InP, marketed by TeraXion and others) may be used for intensity modulation in such modulators. In the FIG. 7 example, a band gap of a semiconductor 58 decreases when an electric field is applied across it, causing a transparent semiconductor layer to absorb light due to the reduced band gap. (ref. [1], section 3.4.2). Lithium niobate is also a commonly used material for phase modulation and frequency modulation.

In the FIG. 8 example, the modulator 20 comprises an acousto-optical modulator. For frequency modulation, lithium niobate may be operated as an acousto-optic modulator to provide a frequency shift of up to 1 GHz from an optical carrier frequency. For high temperature applications, use of substances other than the lithium niobate family of crystals may provide enhanced lifetime and temperature stability. Indium phosphide (InP) is one example (ref. [8]). Another candidate crystal is potassium titanyl phosphate (KTP) which has shown greater thermal and mechanical stability, and higher electro-optic figure of merit, compared with lithium niobate modulators normally used in commercial telecom applications (ref. [6]).

In the FIG. 8 example, a quartz crystal 60 is positioned between an acoustic absorber 62 and a piezoelectric transducer 64. An electrical signal drives the transducer 64 to vibrate, which creates acoustic waves in the crystal 60. Incoming light scatters (e.g., via Brillouin scattering) off of refractive index modulation resulting from the acoustic waves in the crystal 60, and interference occurs.

The scope of this disclosure is not limited to any particular types of modulators 20. For example, any of the optical modulators described in chapters 5-12 of ref. [9] could be used. Suitable modulators can include electro-absorption, lithium niobate, indium phosphide, gallium arsenide, electro-optic polymer, silicon and complex oxide electro-optic modulators.

Figure 9:
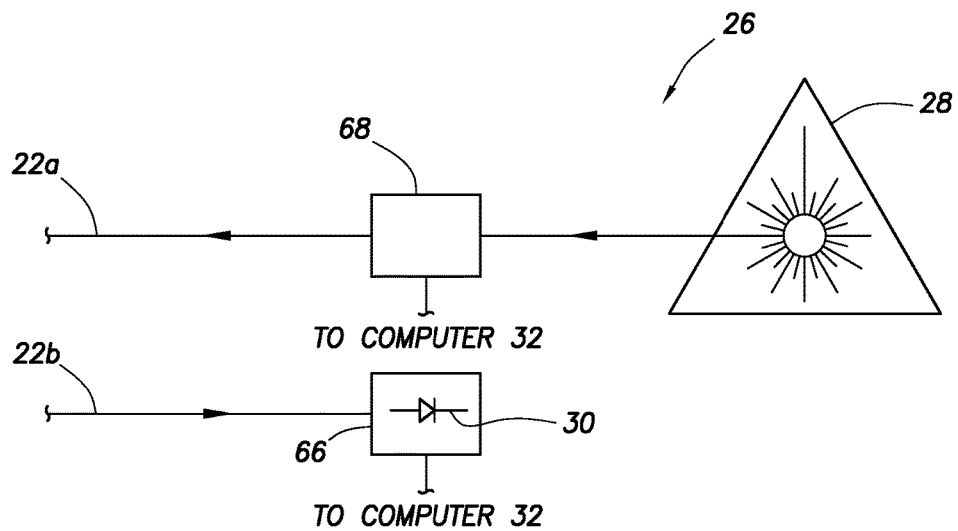
FIGS. 9 & 10 are representative schematic views of modulation and demodulation techniques that may be used with the system and method of FIG. 1.
Figure 10:
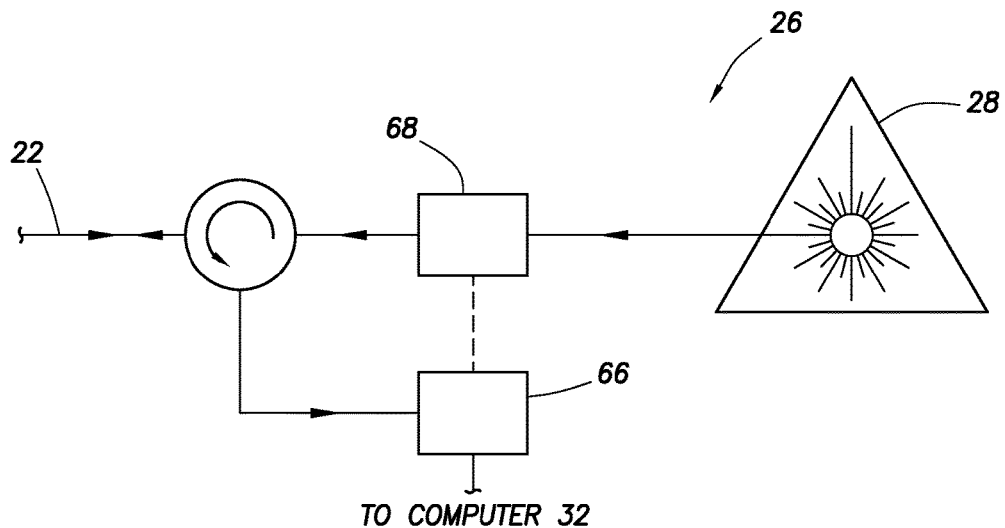

FIGS. 9 & 10 are representative schematic views of modulation and demodulation techniques that may be used at the remote location in the system 10 and method of FIG. 1. Of course, these modulation and demodulation techniques can be used with other systems and methods, in keeping with the scope of this disclosure.

In the FIG. 9 example, the interrogator 26 (or telemetry unit) includes an optical demodulator 66 to convert the modulated optical signal returning from the downhole tool 12, so that the information encoded thereon can be ascertained. The demodulator 66 depicted in FIG. 9 includes the opto-electric converter 30 to convert the optical signal to an electrical signal that can be input, for example, to the computer 32.

The demodulator 66 is preferably designed to match the particular modulation scheme used by the downhole tool 12 (e.g., optical intensity, phase, frequency and/or polarization modulation). The demodulation schemes can be categorized broadly into either intensity modulation with direct detection (IM/DD) or coherent light wave systems.

With the direct detection method depicted in FIG. 9, the particular phase or frequency of the light at any data bit interval is lost and the decoding of the optical signal into binary data is done directly from the electrical amplitude provided by the opto-electric converter 30. Direct detection methods can provide advantages of reduced cost and complexity over coherent detection methods.

For a downhole optical communication system 10 using IM/DD, fluctuations in light polarization in a single-mode fiber may cause amplitude fluctuations and signal fading when using an optical modulator 68 (such as, an electro-optic Mach-Zehnder modulator) that only admits linearly polarized light with a particular alignment. To mitigate the effects of polarization fading, transmitting un-polarized light from the interrogator 26 is preferred.

Un-polarized light can be directly produced using an amplified spontaneous emission (ASE) or light emitting diode (LED) optical source 28. However, these are very broadband sources and can result in dispersion induced signal degradation when used with relatively long optical waveguides 22a,b (several kilometers). Another method is to interpose an optical depolarizing device (not shown) between the optical source 28 and the modulator 68, for example, a Model F-DEP-2-FA depolarizer marketed by Newport Corporation.

In the FIG. 10 example, a coherent light wave method is used. Coherent demodulation methods may provide significant advantages over IM/DD methods, particularly where the light amplitude is not well controlled due to polarization or attenuation fluctuations. A coherent phase or frequency detection method may utilize homodyne or heterodyne detection in the demodulator 66 with a local oscillator. The local oscillator may be the light as modulated by the modulator 68, or a frequency shifted version of that light. (ref. [1], section 10.2).

In some coherent demodulation methods, dynamic light intensity fluctuations due to mechanical vibration, twisting, or strain of the waveguide 22 will have minimal impact on a bit error rate (BER), because light intensity is not being used for encoding digital data. Polarization fluctuations due to perturbations of the downhole cable 24 can be mitigated by the use of polarization diversity methods in these coherent receiver systems (ref. [1], section 10.4.3). Self-coherent demodulation (e.g., delay demodulation) methods may also be used with differential phase shift keying or frequency shift keying modulation, whereby an unbalanced interferometer is used to coherently mix the light from a bit time interval with the light from a next bit time interval (ref. [1], section 10.2.3 and ref. [3]).

In a downhole environment, an optical signal can have a very high noise level, for example, due to vibrations and disturbance to the waveguide 22 from the flow of fluid or gas, or as the cable 24 is raised or lowered in the wellbore 14, or noises created at surface from wellhead equipment, pumping equipment, hoisting/spooling units, etc. These disturbances to the waveguide 22 may cause the bit error rate to rise to an undesirable level.

One way to mitigate this problem is to use forward error correction (FEC) coding (ref. [1], section 5.5). Such FEC coding may be particularly advantageous for the relatively high bit rate telemetry from the downhole tool 12 to the remote location.

Error correcting codes (convolution, Hamming, Reed-Solomon, Golay, Turbo, etc.) are well known to those skilled in the art, and are used in commercial communication systems. For downhole use with optical waveguides in a wellbore, the use of a robust code (such as, RS(255, 207)) is preferred, and may optionally be concatenated with a convolution code.

One disadvantage of using FEC coding is redundancies in the data after coding, which reduce the effective bit rate. However, the bit rates of over 100 Mbit/sec available with optical communication methods provides more than enough capacity to implement FEC codes.

Also, applying an error correction code to the data can have a disadvantage of requiring additional computational power in the downhole tool 12. However, many known FEC codes have an important advantage for this application, whereby the encoding process occurring downhole is much simpler computationally than the decoding process occurring at the surface.

In recent years, high-speed microprocessors designed for operation at over 200 deg. C. have become available. For example, the Texas Instruments Harsh Environment Acquisition Terminal (H.E.A.T.) and the SM320F28335-HT digital signal controller are rated for operation up to 210 deg. C., and are capable of performing the encoding process.

In one implementation of this method, the telemetry unit (interrogator 26) at the remote location may send a command to the downhole tool 12 to set the particular FEC code to be used, based on detected noise levels.

Figure 11:
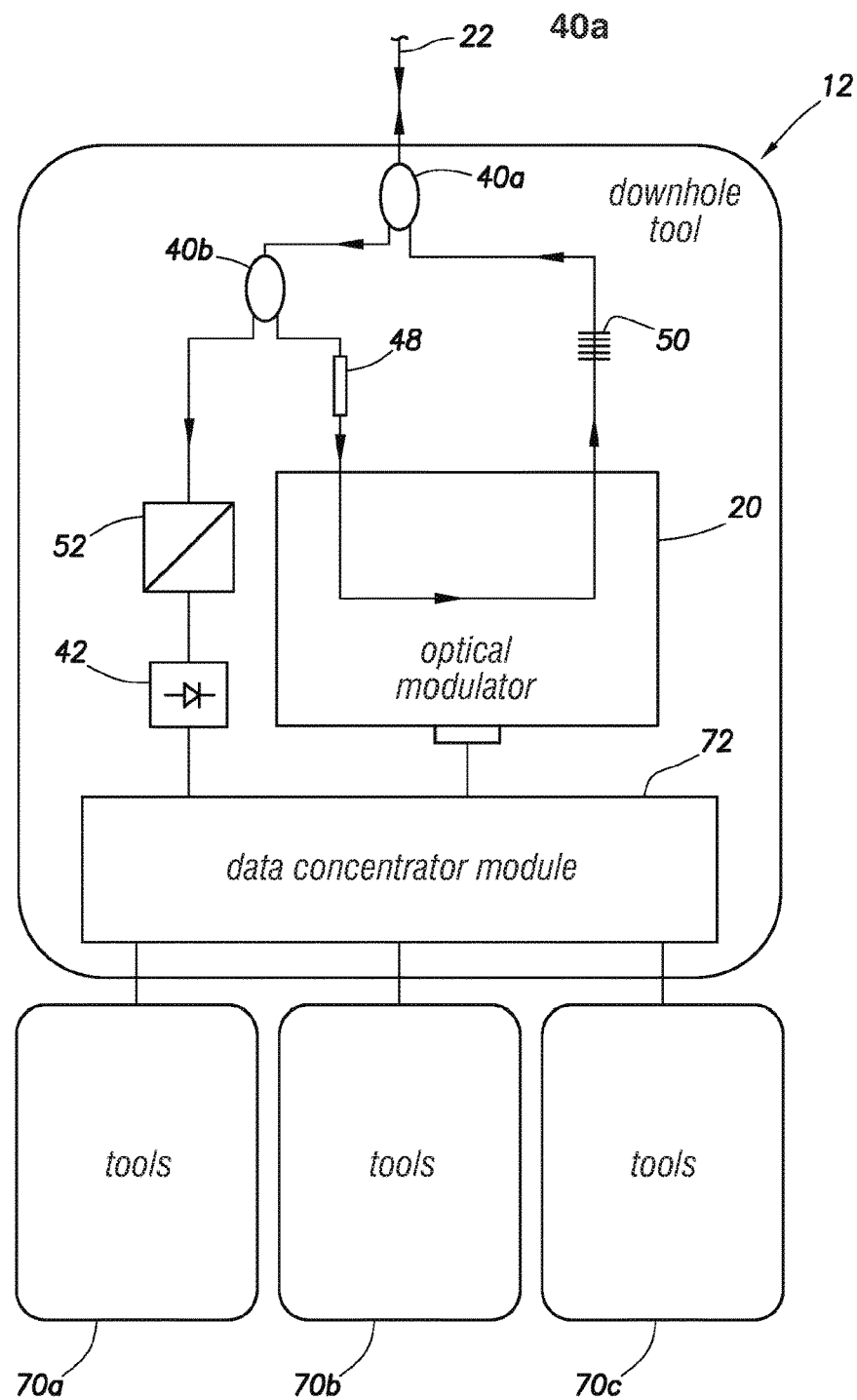
FIG. 11 is a representative schematic view of another example of the downhole tool.

It may be useful, in some examples, to be able to use the optical communication methods described above with prior downhole sensors, sensor packages or tool strings. Currently, tool strings may consist of a plurality of tools, each with a different communication method that may depend on a metal conductor path being available for sending data to the surface. To make use of such prior sensors/tools without significant redesign, a data concentrator module can be used as shown in the example of FIG. 11.

In this example, each prior tool 70*a-c* has a communication method that can be conceptually modeled by way of open systems interconnection (OSI) layers consisting of physical connections, data links, network, etc. (ref. [7]). A data concentrator module 72 in the downhole tool 12 can provide multiple physical or logical communication ports, each configured to support a particular prior tool 70*a-c* communication scheme.

For example, ports may be provided to support electrical physical connection methods (such as, twisted pair wire, co-axial wire, etc.) and/or to support multiple signaling methods, protocols, and bit rates (for example, CANbus, RS485, Ethernet 10Base-T, etc.). The data concentrator module 72 can stream data from the prior tools 70*a-c* as if the tools were connected to their original legacy tool string telemetry units, so that these prior tools can operate with minimal redesign.

The prior tools 70*a-c* interfaced with the data concentrator module 72 may consist of a mixture of low bit rate (e.g., less than 1 Mbit/sec) tools, along with more recently designed high bit rate tools that already provide a compatible interface with the new optical communication system described herein. The data concentrator module 72 may multiplex (e.g., using time-domain and/or frequency-domain multiplexing, etc.), and/or packet switch the data from these tools 70*a-c* continuously and transmit the data through the optical waveguide 22 to the remote location with a desired optical modulation scheme using the optical modulator 20.

Additionally, the data concentrator module 72 may receive data, commands or other information via telemetry from the remote location and distribute it to the appropriate tool(s) 70*a-c* based on an address or any tool identification scheme using a physical and logical communication technique appropriate for the tool. Telemetry adapter modules (not shown) that convert from one physical/logical communication method to another may also be utilized to add additional flexibility.

It may now be fully appreciated that the above disclosure provides significant advancements to the art of high speed communication in a well. In examples described above, the downhole tool 12 can be operated in the hostile environment of the wellbore 14 for extended periods, while effectively transmitting data from the sensors 18, or other information, to the remote location at relatively high speed.

The use of the wavelength conversion device 48 in the single waveguide 22 example of FIG. 5 provides a way to prevent the additional noise created by Rayleigh backscatter from reaching the opto-electric converter 30 at the remote location. Another advancement described above is use of KTP instead of lithium niobate in the optical modulator 20. KTP has greater resiliency (as compared to lithium niobate) for high temperature operation in a well. However, lithium niobate may be used, if desired, without departing from the principles of this disclosure.

Another advancement described above is the use of a subcarrier modulation method, so that the same wavelength of the light can be used for telemetry to and from the tool 12. The use of different wavelengths of light for telemetry to and from the tool 12 can in many cases result in the use of multiple light sources, WDM devices, etc., at additional cost and complexity.

Coherent light wave communication methods described above are robust in the presence of a high vibration/physical disturbance environment typical for wellbore cables. These methods are not mentioned by most prior art.

Also described above is the use of a downhole, remotely pumped ASE source which may have advantages for mitigating polarization issues.

Forward error correction (FEC) can be utilized to mitigate optical noise problems caused by disturbances to the waveguide 22.

Optical communication methods described above can have an ability to use much higher telemetry rates, as compared to metal conductor methods. These optical communication methods may improve data quality, allow for more sophisticated downhole tools, longer tool strings, and tools that require less downhole data processing.

A method of optical communication in a well is provided by the above description. In one example, the method comprises: launching light into an optical waveguide 22 extending in a wellbore 14; modulating in the wellbore 14 light having a wavelength substantially different from a wavelength of the light launched into the optical waveguide 22; and receiving the modulated light at a location (such as, a surface, floating vessel or subsea location) remote from a location of the modulating.

In another example, the method comprises: launching light having substantially coherent phase into an optical waveguide 22 extending in a wellbore 14; modulating light having substantially coherent phase in the wellbore 14; and receiving the modulated light transmitted via the same optical waveguide 22.

The modulated light could in other examples be received via an optical waveguide 22b different from the optical waveguide 22a into which the light was launched.

The modulated light received via the optical waveguide 22 may comprise a portion of the light launched into the optical waveguide 22.

The modulated light received via the optical waveguide 22 can have a wavelength substantially different from a wavelength of the light launched into the optical waveguide 22.

The modulating step may comprise exciting a potassium titanyl phosphate crystal 54 and/or exciting a lithium niobate crystal.

The launching step may include modulating the light launched into the optical waveguide 22. The light launched into the optical waveguide 22 can be modulated using a technique different from a technique used to modulate the light in the wellbore 14.

The method may in some examples be performed without use of an optical source downhole.

Also described above is a well system 10. In one example, the system 10 can include at least one optical waveguide 22 extending in a wellbore 14, and a downhole optical modulator 20 which modulates light transmitted via the optical waveguide 22. The optical modulator 20 may comprise a potassium titanyl phosphate crystal 54 and/or a lithium niobate crystal.

The light transmitted via the optical waveguide 22 may comprise substantially coherent phase light.

The optical waveguide 22 may transmit light toward the optical modulator 20, and the same optical waveguide 22 may transmit light from the optical modulator 20. The light transmitted toward the optical modulator 20 via the optical waveguide 22 can have a wavelength substantially different from a wavelength of the light transmitted from the optical modulator 20 via the optical waveguide 22.

Excitation of the potassium titanyl phosphate crystal 54 (and/or a lithium niobate crystal) may be used to alter a phase and/or a frequency of the light transmitted from the optical modulator 20 via the optical waveguide 22.

Information can be modulated on the light transmitted from the optical modulator 20 using a subcarrier of a carrier on which information is modulated on the light transmitted toward the optical modulator 20.

In some examples, first and second optical waveguides 22a,b may be used, wherein the first optical waveguide 22a transmits light toward the optical modulator 20, and the second optical waveguide 22b transmits light from the optical modulator 20.

In one example of a method of optical communication in a well, the method can comprise: launching light into an optical waveguide 22 extending in a wellbore 14, the light launched into the optical waveguide 22 having information modulated thereon using a carrier; modulating light in the wellbore 14, the modulating step including modulating information using a subcarrier of the carrier; and transmitting the light modulated in the wellbore 14 via the same optical waveguide 22.

The light modulated in the wellbore 14 may comprise a portion of the light launched into the optical waveguide 22. The light modulated in the wellbore 14 can have a wavelength substantially different from a wavelength of the light launched into the optical waveguide 22.

The modulating step may include exciting a potassium titanyl phosphate crystal 54 and/or exciting a lithium niobate crystal. The modulating step may include varying at least one of optical intensity, amplitude, phase, polarization and frequency.

The launching step can include modulating the light launched into the optical waveguide 22 using at least one of the group comprising intensity modulation and polarization modulation. The step of modulating light in the wellbore 14 can include phase modulation.

A well system 10 described above can include at least one optical waveguide 22 extending in a wellbore 14, and a downhole optical modulator 20 which phase modulates substantially coherent light having relatively narrow line width transmitted via the optical waveguide 22. A relatively narrow line width can be less than 10 MHz.

A method of optical communication in a well described above can include: launching light into an optical waveguide 22 extending in a wellbore 14, the light launched into the optical waveguide 22 having information modulated thereon using a first modulation technique; modulating light in the wellbore 14, the modulating comprising modulating information using a second modulation technique different from the first modulation technique; and transmitting the light modulated in the wellbore 14 via the same optical waveguide 22.

In any of the embodiments described herein, in which a potassium titanyl phosphate crystal is excited, a lithium niobate crystal could instead (or in addition) be excited.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

REFERENCES

[1] Agrawal, G., "Fiber-Optic Communication Systems, Fourth Edition" Wiley 2010
[2] Sklar, B., "Digital Communications, 2$^{nd}$ Edition" Prentice Hall 2001
[3] Takushima, Y., "Plug-and-Play Phasor Monitor for DxPSK Signals Based on Single Delay-Interferometer Using a 3×3 Optical Coupler" 2008 Optical Fiber Communication Conference
[4] Ashish, M., "Long-Period Fiber Gratings as Band-Rejection Filters" Journal of Lightwave Technology, Vol. 14, No. 1, January 1996
[5] "CLD340—High Temperature AlGaAs Photodiode" http://www.clairex.com/datasheets/cld340.odf
[6] Bierlein, J. and Vanherzeele, H., "Potassium titanyl phosphate: properties and new applications" J. Opt. Soc. Am. B/Vol. 6, No. 4, April 1989
[7] OSI Model at http://en.wikipedia.org/wiki/OSI model
[8] Prosyk, K., "High Performance 40 GHz InP Mach-Zehnder Modulator" 2012 Optical Fiber Communication Conference
[9] Chen, A. and Murphy, E., "Broadband Optical Modulators: Science, Technology and Applications" CRC Press, 2012, ISBN 978-1-4398-2506-8

What is claimed is:

1. A method of optical communication in a well, the method comprising:
    launching light at a first wavelength, from a first location, into an optical waveguide extending in a wellbore;
    receiving the light by a downhole tool located in the wellbore;
    converting, with an optical wavelength conversion device located downhole in the well, the light at the first wavelength to light at a second wavelength that is different from the first wavelength;
    modulating the light at the second wavelength using an optical modulator at a location in the wellbore, wherein the optical modulator comprises a potassium titanyl phosphate crystal;
    transmitting the modulated light into the optical waveguide in the wellbore; and
    receiving the modulated light at the first location, or a second location remote from the location of the modulation.

2. The method of claim 1, wherein the light launched into the optical waveguide is coherent light.

3. The method of claim 1, wherein the modulated light is received at the remote location via the same optical waveguide into which the light was launched.

4. The method of claim 1, wherein the modulated light is received at the remote location via an optical waveguide different from the optical waveguide into which the light was launched.

5. The method of claim 1, wherein the modulating comprises exciting the potassium titanyl phosphate crystal.

6. The method of claim 1, wherein the launching further comprises modulating the light launched into the optical waveguide.

7. The method of claim 6, wherein the light launched into the optical waveguide is modulated using a technique different from a technique used to modulate the light in the wellbore.

8. The method of claim 1, wherein the wavelength of the light received in the wellbore is different from the wavelength of the modulated light being transmitted in the wellbore.

9. A well system, comprising:
    at least one optical waveguide extending in a wellbore;
    a downhole optical wavelength conversion device excitable to convert light of a first wavelength from the optical waveguide into coherent light of a second wavelength; and
    a downhole optical modulator which phase modulates the coherent light of the second wavelength, wherein the coherent light has a relatively narrow line width that is less than 10 MHz.

10. The system of claim 9, wherein the optical waveguide transmits light toward the optical modulator, and wherein the same optical waveguide transmits light from the optical modulator.

11. The system of claim 10, wherein the light transmitted toward the optical modulator via the optical waveguide has a wavelength different from a wavelength of the light transmitted from the optical modulator via the optical waveguide.

12. The system of claim 10, wherein the downhole optical modulator comprises a potassium titanyl phosphate crystal excitable to alter at least one of the group comprising a phase and a frequency of the light transmitted from the optical modulator via the optical waveguide.

13. The system of claim 10, wherein information is modulated on the light transmitted from the optical modulator using a modulation technique that is different from a modulation technique by which information is modulated on the light transmitted toward the optical modulator.

14. The system of claim 9, wherein the at least one optical waveguide comprises first and second optical waveguides, wherein the first optical waveguide transmits light toward the optical modulator, and wherein the second optical waveguide transmits light from the optical modulator.

15. A method of optical communication in a well, the method comprising:
    launching light at a first wavelength into an optical waveguide extending in a wellbore, the light launched into the optical waveguide having information modulated thereon using a first modulation technique;

converting, with a downhole optical wavelength conversion device, the light at the first wavelength to light at a second wavelength that is different from the first wavelength;

modulating the light at the second wavelength in the wellbore, using an optical modulator comprising a potassium titanyl phosphate crystal, the modulating comprising modulating information using a second modulation technique different from the first modulation technique;

transmitting the light modulated in the wellbore via the same optical waveguide.

16. The method of claim 15, wherein the modulating comprises exciting the potassium titanyl phosphate crystal.

17. The method of claim 15, wherein the light launched into the optical waveguide is coherent light.

18. The method of claim 15, wherein the modulating further comprises varying at least one of the group comprising intensity, polarization, phase and frequency.

19. The method of claim 15, wherein the first modulation technique includes at least one of the group comprising intensity modulation and polarization modulation, and wherein the second modulation technique comprises phase modulation.

* * * * *